United States Patent
Wysocki et al.

(10) Patent No.: US 6,961,502 B1
(45) Date of Patent: Nov. 1, 2005

(54) OPTICAL MODULE INCLUDING AN OPTICALLY LOSSY COMPONENT AND AN ERBIUM-DOPED WAVEGUIDE FOR INSERTION BETWEEN STAGES OF AN OPTICAL AMPLIFIER

(75) Inventors: Paul Francis Wysocki, Flemington, NJ (US); Sergey Frolov, Berkeley Heights, NJ (US); Allan James Bruce, Scotch Plains, NJ (US); Joseph Shmulovich, New Providence, NJ (US); Tek-Ming Shen, Westfield, NJ (US)

(73) Assignee: Inplane Photonics, Inc., South Plainfield, NJ (US)

( * ) Notice: Subject to any disclaimer, the term of this patent is extended or adjusted under 35 U.S.C. 154(b) by 289 days.

(21) Appl. No.: 10/279,479

(22) Filed: Oct. 24, 2002

Related U.S. Application Data
(60) Provisional application No. 60/361,512, filed on Mar. 4, 2002.

(51) Int. Cl.$^7$ ............................................. G02B 6/10
(52) U.S. Cl. ...................................... 385/129; 385/130
(58) Field of Search ................................. 385/129, 130

(56) References Cited

U.S. PATENT DOCUMENTS

| | | | | |
|---|---|---|---|---|
| 5,532,864 A | * | 7/1996 | Alexander et al. | 398/31 |
| 6,125,225 A | * | 9/2000 | Dianov et al. | 385/124 |
| 6,157,765 A | | 12/2000 | Bruce et al. | 385/129 |
| 6,459,846 B1 | * | 10/2002 | Choi et al. | 385/142 |

OTHER PUBLICATIONS

E. Desurvire, *Fundamentals of Noise in Optical Fiber Amplifiers*, Chapter 2.5, "Lumped Amplifier Chains," pp. 114–121, 1994.

R. V. Ramaswamy, "Ion–Exchanged Glass Waveguides: A Review," Journal of Lightwave Technology, vol. 6, No. 6 Jun. 1988, pp. 984–1002.

E. Desurvire et al., "High–gain erbium–doped traveling-wave fiber amplifier," Optics Letters, vol. 12, No. 11, Nov. 1987, pp. 888–890.

R. J. Mears et al., "Low–Noise Erbium–Doped Fibre Amplifier Operating at 1.54 $\mu$m," Electronics Letters, vol. 23, No. 19, Sep. 10, 1987, pp. 1026–1028.

* cited by examiner

*Primary Examiner*—John R. Lee
*Assistant Examiner*—Paul M. Gurzo
(74) *Attorney, Agent, or Firm*—Mayer Fortkort & Williams, PC; Stuart H. Mayer, Esq.

(57) ABSTRACT

An optical module is provided for performing a prescribed function such as dispersion compensation, for example. The optical module is to be integrated between stages of a multi-stage rare-earth doped optical amplifier. The module includes an input port for receiving optical energy from one stage of the rare-earth doped optical amplifier and a rare-earth doped planar waveguide coupled to the input port. An optically lossy, passive element is provided for performing the prescribed function. The optically lossy, passive element is coupled to the planar waveguide for receiving optical energy therefrom. An output port is coupled to the optically lossy, passive element for providing optical energy to another stage of the rare-earth doped optical amplifier. The rare-earth doped planar waveguide has a first unsaturated absorption spectrum and the rare-earth doped optical amplifier has a second unsaturated absorption spectrum such that the ratio of the first to the second absorption spectrum is substantially wavelength independent within the spectral range of incoming and outgoing optical energy. The rare-earth doped planar waveguide has a length determined at least in part from a value of optical loss in the passive element and characteristics of the rare-earth doped optical amplifier.

29 Claims, 2 Drawing Sheets

OPTICAL MODULE INCLUDING AN OPTICALLY LOSSY COMPONENT AND AN ERBIUM-DOPED WAVEGUIDE FOR INSERTION BETWEEN STAGES OF AN OPTICAL AMPLIFIER

STATEMENT OF RELATED APPLICATION

This application claims the benefit of priority to U.S. Provisional Patent Application No. 60/361,512, filed on Mar. 4, 2002, entitled "Erbium-Doped Waveguide In Modular Optically Lossy Inline Components."

FIELD OF THE INVENTION

The present invention relates generally to integrated planar-waveguide components, and more particularly to components integrated with erbium-doped waveguides that can be used in multi-stage inline amplifiers to provide broadband, wavelength-independent gain in optical communication systems.

BACKGROUND OF THE INVENTION

Optical wavelength-division multiplexing (WDM) has now become the standard technique for increasing the transmission capacity of fiber-optic communications systems. Its development began in earnest with the introduction of the erbium-doped fiber amplifier (EDFA)—first reported in 1987 by Desurvire, Simpson and Becker, "High-gain erbium-doped fibre amplifier", *Optics Letters* 12(11):888, and by Mears, Reekie, Jauncey and Payne, "Low-noise erbium-doped fibre amplifier operating at 1.54 µm", *Electronics Letters* 23(19):1026—which could efficiently compensate for the losses generated by the multiplexing and demultiplexing processes. In systems employing wavelength division multiplexing, multiple channels located at different wavelengths are combined, with each channel being separately modulated to carry one or more information-bearing (e.g., voice, video or data) signals. In this manner WDM technology enables the total number of signals that can be simultaneously transmitted over a single optical fiber to be greatly increased.

Modern telecommunication systems rely heavily upon transmission of optical WDM signals across long spans of optical fiber. As the light propagates from a transmitter to a receiver through the optical network, it loses energy in the transmission fiber itself (primarily due to light scattering) and also in the other fiber-optic components in the network (by more general loss mechanisms). In order to prevent this energy depletion, optical signals are repeatedly amplified at various points in the network. The erbium-doped fiber amplifier is generally considered to be an optimal amplifier for optical signals in the wavelength range from about 1525 nm to 1570 nm. This range (sometimes referred to as the C-band) is the most frequently used band for optical communications as discussed, for example, in volumes (IIIA and IIIB) of 'Optical Fiber Telecommunications", edited by I. P. Kaminow and T. L. Koch, Academic Press (1997). Indeed, EDFA's are regularly used in almost every part of a fiber-optic network: as power boosters in transmitters, as in-line amplifiers in long fiber spans, as pre-amplifiers in receivers, and the like.

An erbium-doped waveguide amplifier, or EDWA (a recent example of which has been described in U.S. Pat. No. 6,157,765 by A. J. Bruce and J.Shmulovich), has properties similar to those of an EDFA. Unlike EDFAS, however, EDWA's are waveguides that are manufactured on planar substrates using glass hosts that may differ dramatically in composition from those used in EDFAS. Although less efficient, in many instances EDWA's have advantages compared to EDFAs. For example, a packaged EDWA chip has a much smaller size than a packaged EDFA. Moreover, it is natural and straightforward to integrate an EDWA with other passive or active optical components on the same planar substrate, which is impossible with EDFAS. Also, in some instances the integrated module may be able to perform functions that are not achievable by its fiber-optic analog.

In designing an EDFA or an EDWA a number of basic principles must be taken into account, some of which will be presented below to better facilitate an understanding of the present invention. In a typical EDFA, the gain per unit length at a given position x along its length and at a wavelength $\lambda$ is given by the following expression $$\gamma(x,\lambda) = N_1(x)\gamma^*(\lambda) - N_0(x)\alpha(\lambda) \approx \alpha(\lambda)\{(N_1(x)(\eta(\lambda)+1)-1\}, \quad (1)$$

where $N_1$ and $N_0$ are the fractions of inverted and non-inverted Er ions, respectively (ideally, $N_1+N_0=1$), $\gamma^*$ is the gain coefficient of a fully inverted amplifier, $\alpha$ is the absorption coefficient of a non-inverted amplifier, and $\eta$ is the ratio between $\gamma^*$ and $\alpha$. $N_1$ represents the inversion level of the amplifier and depends on both the pump and the signal power. Usually, at the input end of an EDFA the pump power is high and the signal power is low, therefore $N_1$ is high and may reach 99%. However, at the output end the pump power is relatively low, whereas the signal power is relatively high, which results in a lower $N_1$, which sometimes decreases to as low as 40%. In order to obtain the total gain $G(\lambda)$ of the amplifier $\gamma(x)$ must integrated over the length $\Lambda$ of the amplifier:

$$G(\lambda) = \int_0^\Lambda \gamma(x, \lambda) dx = \langle \gamma(\lambda) \rangle \Lambda, \quad (2)$$

where the average gain per unit length ($\langle \gamma(\lambda) \rangle$) is given by $$\langle \gamma(\lambda) \rangle = \frac{1}{\Lambda}\int_0^\Lambda \alpha(\lambda)\{N_1(x)(\eta(\lambda)+1\}dx = \alpha(\lambda)\{\langle N_1 \rangle(\eta(\lambda)+1)-1\}. \quad (3)$$

It is apparent from Eq.3 that the spectral shape of the gain is completely determined by the average inversion level of the amplifier. This equation also holds for an amplifier consisting of two or more stages, provided that these stages all employ doped fibers having the same composition. If some amplifier stages have different doping levels, Eq.3 needs to be modified as shown below. Changes in the Er doping level, Er distribution, or the fiber cross-section affect primarily the amplitude of the absorption spectrum ($\alpha(\lambda)$), which in turn modifies only the magnitude of the gain and leaves its spectral shape unaffected. However, any change in the nature of the glass fiber that hosts the Er ions does affect the shape of both the $\alpha(\lambda)$ and $\eta(\lambda)$ spectra, and thus may also alter the shape of the gain spectrum. It should be noted that these conclusions are applicable to any EDFA and are therefore very important in the design of multistage in-line amplifiers.

FIG. 1 shows a typical multistage in-line EDFA (only three stages of which are shown), consisting of separate gain sections or stages 101, 102 and 103 that have respective gains $G_k$, k=1,2,3 . . . n (where n is the total number of stages in the amplifier). Lossy optical elements 104, 105, 106 and 107 may be positioned between the amplifier stages, which have losses $L_0, L_1, L_2, \ldots, L_n$, respectively. All the components are connected with single mode fibers 108. $L_0$ and $L_n$ are losses at the input and output of the EDFA, respectively, which include losses due to isolators, taps, pump couplers and so on. $L_1, L_2 \ldots, L_{n-1}$ include losses due to optical components such as filters, variable optical attenuators (VOA), dispersion compensation modules (DCM), add-drops and other components that are sometimes located between amplifier stages. As a result, the total gain (in dB) of the EDFA is given by $$G_{tot} = -L_0 + \sum_{k=1}^{n}(G_k - L_k). \quad (4)$$

Each stage can also be characterized by its respective noise figure $f_1$ through $f_n$, which is defined as the ratio between the input and output signal-to-noise ratios (SNR), or by its counterpart $F_1$ through $F_n$, which is expressed in units of dB. Various noise sources contribute to the degradation of the signal-to-noise ratio; in an EDFA a primary source is the so-called signal-spontaneous beat noise, which determines the noise floor of the amplifier. The output noise figure, which can be calculated from a knowledge of the noise figures of each individual stage, can be expressed in the form (see, for example, "Erbium-Doped Fiber Amplifiers", by E. Desurvire, Wiley and Sons Inc., New York, 1994):

$$f_{tot} = \sum_{k=1}^{n} \frac{f_k}{\prod_{i=0}^{k-1} l_i \cdot g_i} \quad (5)$$

where $l_i$ and $g_i$ are the i-th stage loss and gain ($g_0=1$) measured in linear units (for comparison $L_i$ and $G_i$ are in dB). Since $l_i g_i \gg 1$ for $i>0$, it is clear from Eq. 5 that the first stage of the amplifier has the strongest effect on the overall noise figure and that the last stage has the least effect. Therefore, an in-line amplifier having multiple stages allows the different stages to be optimized for different functions. For example, a two-stage EDFA may consist of a preamplifier optimized to have a low noise figure and a power amplifier optimized to have a high output power.

Under typical operating conditions, $G_{tot}$ is equal to the span loss, which is generally about 20–26 dB, so that the output signal power for 40 WDM channels is about 20 dBm. This implies that for the three-stage amplifier in FIG. 1, the $3^{rd}$ stage operates in deep saturation and its gain is highly compressed, resulting in a typical noise figure in excess of 6 dB. On the other hand, the first two stages are typically highly inverted and are characterized by a low noise figure of about 4 dB.

As previously mentioned, for a variety of reasons it is often desirable to place various passive fiber-optic components between the amplifier stages. For example, a DCM may be inserted between the $1^{st}$ and the $2^{nd}$ stages and a gain-flattening filter between the $2^{nd}$ and the $3^{rd}$ stages. While other optional passive elements also may be present between the stages, one element that is almost always required between the stages of an in-line EDFA is a gain-flattening filter to optimize the amplifier performance to provide a broadband, nearly wavelength independent, signal gain, i.e. a spectrally flat gain. The best gain flatness is often achieved by inserting a gain-flattening filter between the amplifier stages, i.e., by introducing a wavelength-dependent loss $L_k(\lambda)$:

$$G_{tot}(\lambda) = \langle \gamma(\lambda) \rangle \Lambda_{tot} - \sum_{k=0}^{n} L_k(\lambda), \quad (6)$$

where $\Lambda_{tot}$ is the total length of Er fiber in the EDFA and $\langle \gamma(\lambda) \rangle$ is the average gain per unit length as determined by ($N_1$) in Eq. 3. It is not necessary to have a gain-flattening filter between every stage, one filter is often sufficient for the whole amplifier.

The gain-flattening filter is usually optimized for operating conditions corresponding to some fixed average inversion level ($N_1$), which is governed by fixed values of $G_k$ and $L_k$. Thus, if the amplifier is reconfigured (e.g., by inserting or removing a passive component between amplifier stages) so that the value of the loss $L_k$ is changed, this in turn alters the average inversion level ($N_1$), and the resulting gain spectrum is generally no longer flat. As a result an active element such as a variable optical attenuator (VOA) is generally required to actively adjust the interstage losses so that the gain flatness of the EDFA can be controlled. Such an active element can preserve the gain flatness of the amplifier by counter-compensating for the change in operating conditions. For example, if a DCM having an insertion loss of 10 dB is replaced with a different DCM having an insertion loss of 5 dB, the VOA can be tuned in front of the DCM to provide an additional 5 dB loss, so that the overall loss (and hence the gain) is not altered. While the VOA can maintain the gain flatness of the EDFA while providing flexibility in the amplifier configuration, the additional cost and complexity of a VOA, as well as the cost associated with the active control of the VOA, becomes problematic.

It would therefore be desirable to provide a method and apparatus by which optically lossy elements can be inserted, removed or interchanged between one or more stages of a multi-stage optical amplifier without the need for a variable optical attenuator.

SUMMARY OF THE INVENTION

In accordance with the present invention, an optical module is provided for performing a prescribed function. The optical module is to be integrated between stages of a multi-stage rare-earth doped optical amplifier. The module includes an input port for receiving optical energy from one stage of the rare-earth doped optical amplifier and a rare-earth doped planar waveguide coupled to the input port. An optically lossy, passive element is provided for performing the prescribed function. The optically lossy, passive element is coupled to the planar waveguide for receiving optical energy therefrom. An output port is coupled to the optically lossy, passive element for providing optical energy to another stage of the rare-earth doped optical amplifier. The rare-earth doped planar waveguide has a first unsaturated absorption spectrum and the rare-earth doped optical amplifier has a second unsaturated absorption spectrum such that the ratio of the first to the second absorption spectrum is substantially wavelength independent within the spectral range of incoming and outgoing optical energy. The rare-earth doped planar waveguide has a length determined at least in part from a value of optical loss in the passive element and characteristics of the rare-earth doped optical amplifier.

In accordance with one aspect of the invention, the optically lossy, passive element is a passive optical planar waveguide.

In accordance with one aspect of the invention, a common planar substrate is provided on which the passive optical planar waveguide and the rare-earth doped waveguide are formed.

In accordance with one aspect of the invention, the optically lossy, passive element includes a single mode fiber.

In accordance with one aspect of the invention, the optically lossy, passive element includes a multimode fiber.

In accordance with one aspect of the invention, the optically lossy, passive element is a dispersion-compensating module.

In accordance with one aspect of the invention, the dispersion compensating module provides tunable dispersion in the spectral range of the incoming and outgoing optical energy.

In accordance with one aspect of the invention, the dispersion compensating module provides tunable dispersion and dispersion slope in the spectral range of the incoming and outgoing optical energy.

In accordance with one aspect of the invention, the dispersion compensating module is a planar optical waveguide.

In accordance with one aspect of the invention, the optically lossy, passive element is an add-drop filter.

In accordance with another aspect of the invention, a method is provided for making an optical module for performing a prescribed function between stages of a rare-earth doped optical amplifier having a first unsaturated absorption spectrum. The method begins by providing an optically lossy, passive element for performing the prescribed function. A rare-earth doped planar waveguide is selected having (a) a second unsaturated absorption spectrum such that the ratio of the first to the second absorption spectrum is substantially wavelength independent within the spectral range of optical energy incoming to and outgoing from the optical amplifier and (b) a length determined at least in part from a value of optical loss in the passive element and characteristics of the rare-earth doped optical amplifier. The optically lossy, passive element is coupled to the rare-earth doped planar waveguide.

DETAILED DESCRIPTION

Figure 1:
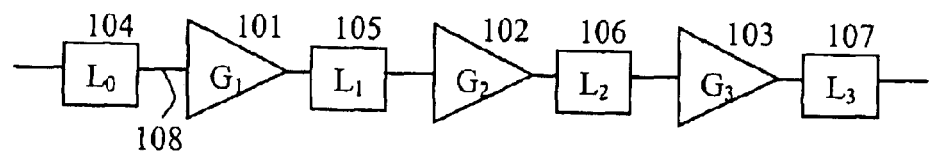
FIG. 1 is a schematic of a conventional three-stage in-line EDFA.
Figure 2:
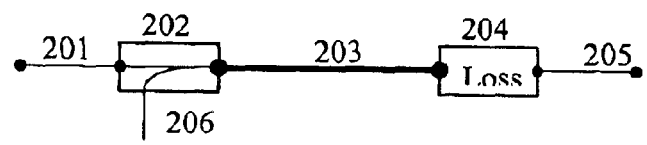
FIG. 2 schematically illustrates one embodiment an optical module of the present invention.

The present invention provides an optically lossy element such as a dispersion compensating module, an optical add-drop filter, or an optical cross-connect, that can be inserted, removed or interchanged between one or more stages of a multi-stage optical amplifier without requiring the need of a variable optical attenuator to maintain the gain shape of the amplifier. The optically lossy element is incorporated into an optical module such as shown in FIG. 2. The module most typically will be used in front of the last stage of a multistage in-line EDFA, although it may be employed between any of the amplifier stages. Optical module 200 includes an input waveguide 201, a pump coupler 202, an erbium-doped waveguide (EDW) 203, functional optically lossy element 204 and an output waveguide 205. In addition, a pump input waveguide 206 provides pump coupler 200 with pump energy from a pump laser that may or may not be integrated with the rest of the module. As explained below, EDW 203 is designed to substantially compensate for the loss introduced into a multi-stage amplifier by the lossy element 204 so that the overall performance of the amplifier is improved. The EDW 203 section can be either unpumped or pumped; in the latter case the noise figure of the in-line amplifier is improved.

The physical characteristics of the EDW 203 necessary for it to perform in the aforementioned manner can be determined from the following analysis. Let $L_m$ be the loss of element 204, $\alpha_m(\lambda)$ the absorption per unit length of the EDW 203, and $\Lambda_m$ the length of the EDW 203. When optical module 200 is inserted between one of the stages of an in-line optical amplifier such as an EDFA, the EDFA can be be characterized by its gain and loss parameters $$G_{tot}, L_{tot}\left(L_{tot} = \sum_{k=0}^{n} L_k\right),$$

an absorption per unit length $\alpha_{in}(\lambda)$ and a total length $\Lambda_{in}$. The resulting average gain per unit length in the EDFA $(\gamma)_{in}$ can be calculated from Eq.6; the corresponding average inversion level ($N_1$) can then calculated using Eq.3.

Based on the previous discussion, if the insertion of optical module 200 between the stages of an EDFA is to avoid substantially changing the overall gain flatness of the EDFA, then the insertion of the module 200 should not change the overall average inversion level ($N_1$) of the EDFA. This requirement can be fuilfilled by first selecting an appropriate glass host for EDW 203 and then choosing an appropriate value for its length $\Lambda_m$. The appropriate length $\Lambda_m$ of the EDW 203 can be obtained by recognizing that one of the many many possible operating conditions of the optical module 200 is specified when the average inversion in the module 200 $(N_1)_m$ is equal to the average inversion in the in-line amplifier $(N_1)_{in}$:

$$(N_1)_m = (N_1)_{in} \qquad (7)$$

This condition fulfils the requirement nessessary to prevent substantially all but a minimal change in the gain flatness of the amplifier when the optical module 200 is inserted or removed. It is easy to see from Eq.3 that in order to meet the condition prescribed by Eq.7 the following average gain per unit length $(\gamma)_{in}$ must be attained in the optical module 200:

$$\langle\gamma\rangle_m = \frac{\alpha_{in}}{\alpha_{in}}\langle\gamma\rangle_{in} \qquad (8)$$

The amplifying portion of module 200, i.e., EDW 203, must compensate for the insertion losses of the other parts of the module 200, i.e. $L_m = G_m = (\gamma)_m \Lambda_m$. Therefore, the length $\Lambda_m$ of EDW 203 must be:

$$\Lambda_{in} = \frac{\alpha_{in}}{\alpha_{in}} \frac{L_{in}}{\langle\gamma\rangle_{in}}. \qquad (9)$$

In some embodiments of the invention it may be desirable to select a glass host for the EDW 203 that closely matches that of the EDFA glass. In this way the ratio $\alpha_{in}/\alpha_m$ will be nearly wavelength independent and therefore may be considered a constant.

Figure 3:
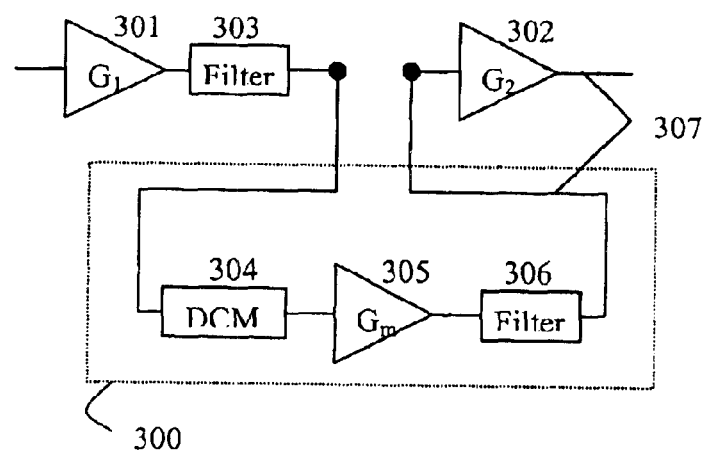
FIG. 3 illustrates another embodiment of the optical module of the present invention, which is inserted into a two-stage EDFA.
Figure 4:
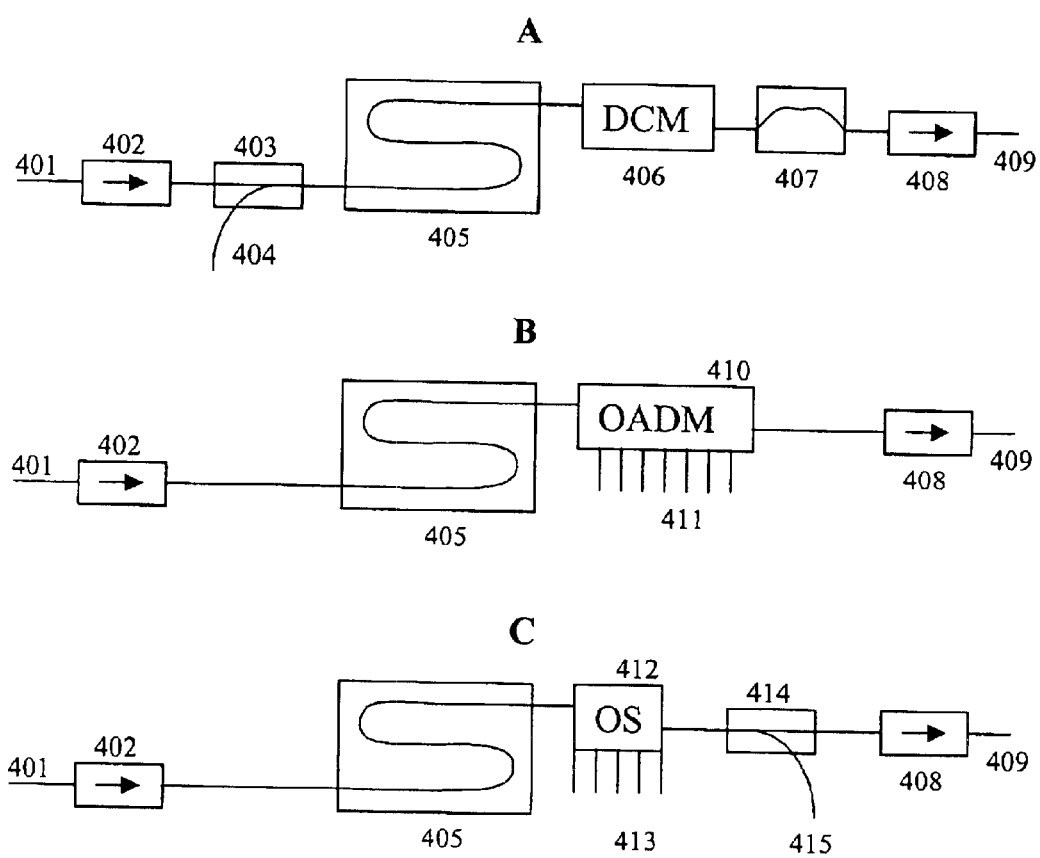
FIG. 4 illustrates additional embodiments of the present invention in which the functional, optically lossy components are (A) a dispersion compensating module, (B) an optical add-drop module and (C) an optical splitter.
Figure 5:
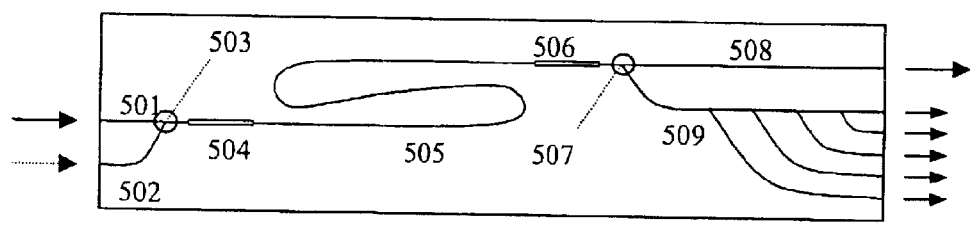
FIG. 5 illustrates an embodiment of an optical module based on a silica-on silicon platform that is designed to tap a portion of the EDFA-amplified multiplexed signals and de-multiplex them into separate sub-bands.

FIGS. 3-5 show some exemplary embodiments of the inventive optical module to further illustrate the principles of the present invention.

FIG. 3 shows a two-stage EDFA that includes an integrated gain-flattening filter 303 that is located between the first and second amplifier stages 301 and 302. The inventive optical module 300 is located immediately following gain-flattening filter 303. The optical module 300 includes a functional optical lossy element 304, which in this example is a DCM with 7 dB insertion loss, an EDW 305 and an optional gain flattening filter 306. In some embodiments of the invention all of the discrete elements in FIG. 3 are interconnected with the single mode fiber 307. However, in other embodiments of the invention the elements within the optical module 300 may be integrated on the same planar substrate without the use of fibers. For simplicity, FIG. 3 does not show some elements like couplers, taps and isolators, which are assumed lossless and accordingly are not considered here. This assumption does not affect the conclusions presented herein.

Continuing with the example shown in FIG. 3, the first stage 301 of the amplifier is configured to receive 40 WDM channels that span a wavelength range from 1528 to 1564 nm with a total input power of $P_i=-5$ dBm. The first stage 301 is pumped using a 980 nm pump laser providing about 150 mW of maximum output power. The gain of the first stage 301 is about $G_1=21$ dB, which results in an output signal power of 16 dBm from the first stage 301. The gain-flattening filter 303 has an effective insertion loss of $L_f=7$ dB, which decreases the input signal power to the second amplifier stage 302 to 9 dBm. The second stage 302 is pumped by two 1480 nm pumps and has a gain $G_2=12$ dB; its function is to maintain the output power of the EDFA at 21 dBm. This is usually accomplished by operating the second stage 302 in deep saturation so that if the input to the second stage 302 varies, the output power remains unchanged. The lengths of the erbium-doped fibers in the first and second stages 301 and 302 are 15 m each; the fibers are identical with a peak absorption coefficient $\alpha_{peak}$ of about 3.2 dB/m. The average gain per unit length is calculated to be $\langle\gamma\rangle_{in}$ of $(G_1+G_2)/(L_1+L_2)=1.1$ dB/m, which corresponds to an average inversion level $(N_1)$ of about 67%.

The DCM 304 in optical module 300 has a length $L_m$ of about 7 dB and the EDW 305 has an $\alpha_{peak}$ of about 3.0 dB/cm ($\eta(\lambda)$) of the EDW 305 is identical to that of the erbium-doped fiber (EDF) in amplifier stages 301 and 302). From Eq. 9 the length $\Lambda_m$ of DCM 304 is calculated to be about 6.8 cm. In order to calculate the total amplifier gain with the optical module 300 inserted between the stages 301 and 302, the EDW 305 can be replaced with an equivalent EDF having an effective length $\Lambda_{eff}=6.36$ m, which is defined as:

$$\Lambda_{eff} = \frac{L_{in}}{\langle\gamma\rangle_{in}}. \qquad (10)$$

It is easy to show that the light transmission through such an EDF is identical to that of the EDW with $\Lambda_m = (\alpha_{in}/\alpha_m)\Lambda_{eff}$.

Since the input and output powers to the amplifier are not changed, the total gain of the EDFA with the optical module 300 is given by.

$$G_{tot}=G_1+G_2+L_m. \qquad (11)$$

The average gain per unit length $(\gamma)_m$ with the optical module 300 is then as follows:

$$\langle\gamma\rangle_{in} = \frac{G_{tot}}{\Lambda_1+\Lambda_2+\Lambda_{eff}} = \frac{G_1+G_2}{\Lambda_1+\Lambda_2} = \langle\gamma\rangle_{in}. \qquad (12)$$

Equation 12 confirms that the average fractional population of the inversion level is unchanged and that consequently the effect of the optical module on gain flatness is minimized. However, since the gain-flattening filter 303 optimizes the gain flatness only at one particular value of $G_{tot}^*$, namely $G_{tot}^*=G_1+G_2=33$ dB, the additional ripple in the gain spectrum induced by the change in operating conditions ($G_{tot}-G_{tot}^*=7$ dB) can be corrected only with an additional gain-flattening filter 306. The addition of filter 306, however, is optional and depends on the gain flatness tolerance that is required.

It is interesting to note that the above discussion did not assume whether or not the EDW 305 was pumped. It also did not assume that the condition defined by Eq. 7 was met, indicating that this condition is too restrictive. The only constraint on the optical module is for it to have an and EDFW 305 with a length given by Eq. 9. Accordingly, the principles of the present invention hold regardless of whether the EDW 305 provides actual gain or loss to the signals. The effect of the pump manifests itself only in the overall noise figure of the EDFA. From Eq. 5 it is clear that having gain in the EDW 305, which in this case acts as a mid-stage of a three-stage amplifier, improves the noise figure $F_{tot}$ (although it does not increase $G_{tot}$).

FIG. 4 shows some other embodiments of the optical module depicted in FIG. 2. In FIG. 4(A) the optical module 400 includes a signal input fiber 401, isolator 402, WDM coupler 403 for coupling the signal and co-propagating pump energy (which may have a pump wavelength of either 980 nm or 1480 nm), pump input 404, erbium-doped waveguide 405, dispersion compensating module 406 (which could be either fixed or tunable), gain flattening filter 407, isolator 408, and signal output port 409. In FIG. 4(B) the optical module 400 includes signal input fiber 401 and isolator 402 coupled to EDW 405, optical add-drop module (OADM) 410, isolator 408, output fiber 409, and multiple input and output fibers 411 associated with the OADM 410. FIG. 4(C) includes signal input fiber 401 and isolator 402 coupled to EDW 405, optical splitter 412 (1-to-6 in this example), WDM coupler 414 for coupling the signal and counter-propagating pump energy (which may have a pump wavelength of either 980 nm or 1480 run), pump input 415, isolator 408, signal output 409, and five additional outputs 413 from the splitter 412.

There are several technological platforms available for the manufacturing of the inventive optical module. These platforms primarily include silica-on-silicon planar waveguide technology and ion-exchange glass technology, which have currently proven to be the most practical. However, while these technolgies will be discussed below, the inventive optical module is not limited to any particular platform and thus may be manufactured in any available technology platform.

Ion exchange technology is a well-developed technique for fabricating planar waveguide (see, for example, Ramaswamy and Srivastava, Ion-exchanged glass waveguides: a review," *J. Lightwave Technology* 6(6):984). In this technique a glass substrate is selectively doped by ions, typically $Na^+$. The refractive index in the doped regions is raised and, as a result, a waveguide is formed in those regions. However, the typical glass substrates used in this process are P-doped silicate glasses and are dramatically different from the glass hosts used in EDFA manufacturing. As a consequence, if the glass formed by an ion-exchange process is doped with erbium, the resulting gain spectrum will be very different from the typical gain spectrum of an EDFA. This makes ion-exchange technology less attractive for the manufacturing of the inventive optical module.

As an alternative to ion exchange technology, silica-on-silicon technology may be employed to fabricate the inventive optical module. An important advantage of this technique is that it is not limited to P-doped glass hosts and, in fact, can readily utilize alumino-silicate glasses that are compositionally similar to those used in an EDFA. The manufacturing process in this case consists of several key sequential steps: (1) deposition of a lower cladding consisting typically of pure silica, (2) deposition of an erbium-doped glass film, (3) photolithographic patterning of the Er-doped film and (4) deposition of an upper cladding consisting typically of doped silica. Other processing steps can be added to increase the functionality of the optical circuit, e.g. adding additional glass layers or metallization steps to produce actively-controlled light guiding circuits. Integration of several different processes on the same manufacturing platform makes the silica-on-silicon technology very attractive for modular EDWA applications.

The following example illustrates an embodiment of the inventive optical module based on a silica-on-silicon platform. The module, which is formed on a single chip formed on a common silicon wafer such as shown in FIG. 5, consists of a signal input waveguide 501, an input waveguide 502 for an optional pump laser input, a WDM coupler 503, a mode transformer 504 located between erbium doped and undoped waveguides, a circuitous erbium-doped waveguide 505, a second mode transformer 506, an optical tap 507, an output waveguide 508, and a coarse WDM splitter 509 with several wavelength-selective output waveguides. The erbium-doped waveguide is made using an alumino-silicate glass host; the other waveguide components performing passive functions are made of P-doped silica. The mode transformers provide efficient coupling between the doped and undoped waveguides. The purpose of this particular design is to tap a portion of the multiple-wavelength multiplexed signals transmitted through an in-line amplifier and coarsely demultiplex them into separate sub-bands. The essential part of this circuit is the erbium-doped waveguide 505, the length of which is optimized to compensate for the insertion losses due to the optical tap, the coupling between the chip and input and output fibers, and waveguide scattering on the chip. The optimization of the length is performed for a particular average inversion level, as determined by the in-line amplifier in which this optical module is to be used.

The above discussion does not limit the insertion of the modular EDWA to the mid-stage access ports of the in-line amplifier. It is easy to see that the above arguments remain valid with the module inserted anywhere in the network, e.g. in front of or immediately after the in-line EDFA. The actual position of the module in the network affects only the overall noise figure; it does not change overall gain flatness. Moreover, the module may be used in other type of multi-stage amplifiers. For example, the optical module can be used in combination with hybrid amplifiers consisting of EDFA's and Raman amplifiers.

What is claimed is:

1. An optical module for performing a prescribed function, said optical module to be integrated between stages of a multi-stage rare-earth doped optical amplifier, said module comprising:
    an input port for receiving optical energy from one stage of the rare-earth doped optical amplifier;
    a rare-doped planar waveguide coupled to the input port;
    an optically lossy, passive element for performing the prescribed function, said optically lossy, passive element being coupled to the planar waveguide for receiving optical energy therefrom;
    an output port coupled to the optically lossy, passive element for providing optical energy to another stage of the rare-earth doped optical amplifier; and wherein the rare-earth doped planar waveguide has a first unsaturated absorption spectrum and the rare-earth doped optical amplifier has a second unsaturated absorption spectum such that the ratio of the first to the second absorption spectrum is substantially wavelength independent within the spectral range of incoming and outgoing optical energy, said rare-arth doped planar waveguide having a length determined at least in part from a value of optical loss in the passive element and characteristics of the rare-earth doped optical amplifier.

2. The optical module of claim 1 wherein said optically lossy, passive element is a passive optical planar waveguide.

3. The optical module of claim 2 further comprising a common planar substrate on which said passive optical planar waveguide and said rare-earth doped waveguide are formed.

4. The optical module of claim 1 wherein said optically lossy, passive element includes a single mode fiber.

5. The optical module of claim 1 wherein said optically lossy, passive element includes a multimode fiber.

6. The optical module of claim 1 wherein said optically lossy, passive clement is a dispersion-compensating module.

7. The optical module of claim 6 wherein said dispersion compensating module provides tunable dispersion in the spectral range of the incoming and outgoing optical energy.

8. The optical module of claim 6 wherein said dispersion compensating module provides tunable dispersion and dispersion slope in the spectral range of the incoming and outgoing optical energy.

9. The optical module of claim 6 wherein said dispersion compensating module is a planar optical waveguide.

10. The optical module of claim 1 wherein said optically lossy, passive element is an add-drop filter.

11. The optical module of claim 1 wherein said optically lossy, passive element is an arrayed waveguide grating.

12. The optical module of claim 1 wherein said optically lossy, passive element is an optical switch.

13. The optical module of claim 12 wherein said optical switch is produced from planar waveguides.

14. The optical module of claim 1 wherein said optically lossy, passive element is an optical cross-connect switch.

15. The optical module of claim 1 wherein said optically lossy, passive element is a narrow-band filter.

16. The optical module of claim 15 wherein said narrow-band filter is produced from a planar optical waveguide.

11

17. The optical module of claim 1 further comprising a coupler having an output coupled to the rare-earth doped waveguide and a pump energy source coupled to an input of the coupler.

18. The optical module of claim 17 further comprising a substrate on which said coupler and said rare-earth doped waveguide are formed, said coupler being formed from a planar waveguide.

19. The optical module of claim 17 further comprising a substrate on which said rare-earth doped waveguide is formed and on which said pump energy source is located.

20. The optical module of claim 1 wherein said rare-earth doped waveguide is coupled to said input and output ports via respective planar waveguide mode transformers.

21. The optical module of claim 1 further comprising a gain flattening filter coupled to the rare-earth doped waveguide for providing a correction to the gain spectrum that is proportional to the amount of loss introduced by said optically lossy, passive element.

22. The optical module of claim 21 further comprising a first optical isolator coupling the input port to the rare-earth doped waveguide and a second optical isolator coupling the rare-earth doped waveguide to the output port.

23. The optical module of claim 1 further comprising an input waveguide coupling the input port to the rare-earth doped waveguide and an output waveguide coupling the output port to the rare-earth doped waveguide.

24. The optical module of claim 22 further comprising an input waveguide coupling the input port to the rare-earth doped waveguide and an output waveguide coupling the output port to the rare-earth doped waveguide, said first and second optical isolators being located along said input and output waveguides, respectively.

25. The optical module of claim 23 further comprising optical taps respectively coupled to said input waveguide and to said output waveguide.

26. The optical module of claim 23 further comprising optical isolators respectively coupled to said input waveguide and said output waveguide.

27. The optical module of claim 1 wherein said characteristics of the rare-earth doped optical amplifier include the unsaturated absorption spectrum of the rare-earth doped optical amplifier and an average population inversion level at which rare-earth doped fiber in the optical amplifier operates.

28. The optical module of claim 1 wherein said characteristics of the rare-earth doped optical amplifier include the unsaturated absorption spectrum of the rare-earth doped optical amplifier and a value of average gain per unit length of the rare-earth doped optical amplifier.

29. The optical module of claim 1 wherein said rarer doped optical amplifier is an erbium-doped optical amplifier and said rare-earth doped planar waveguide is an erbium-doped planar waveguide.

\* \* \* \* \*